United States Patent [19]

Allisbaugh

[11] 4,297,990
[45] Nov. 3, 1981

[54] SOLAR COLLECTOR

[75] Inventor: John H. Allisbaugh, Indianapolis, Ind.

[73] Assignee: HowAll Products, Inc., Indianapolis, Ind.

[21] Appl. No.: 18,652

[22] Filed: Mar. 8, 1979

[51] Int. Cl.³ .............................................. F24J 3/02
[52] U.S. Cl. .................................... 126/445; 126/417; 126/432; 126/450; 126/449
[58] Field of Search ............... 126/444, 445, 446, 442, 126/432, 417, 429, 450, 449; 165/166, 167, 170, 485; 34/93

[56] References Cited

U.S. PATENT DOCUMENTS

| 991,161 | 5/1911 | McHenry | 126/435 |
|---|---|---|---|
| 2,680,437 | 6/1954 | Miller | 126/441 |
| 3,902,474 | 9/1975 | Pyle | 126/422 |
| 3,955,555 | 5/1976 | Bostrom | 126/419 |
| 3,987,786 | 10/1976 | Keyes et al. | 126/449 |
| 3,995,615 | 12/1976 | Hojnowski | 126/444 |
| 4,016,860 | 4/1977 | Moan | 126/443 |
| 4,018,211 | 4/1977 | Barr | 126/439 |
| 4,020,989 | 5/1977 | Kautz | 126/427 |
| 4,029,080 | 6/1977 | Warren | 126/435 |
| 4,038,969 | 8/1977 | Smith | 126/448 |
| 4,046,133 | 9/1977 | Cook | 126/429 |
| 4,066,062 | 1/1978 | Houston | 126/445 X |
| 4,085,729 | 4/1978 | Schmidt | 126/432 |
| 4,086,908 | 5/1978 | Werner et al. | 126/432 |
| 4,086,909 | 5/1978 | Lyon et al. | 126/432 |
| 4,098,262 | 7/1978 | Peters | 126/444 |
| 4,141,338 | 2/1979 | Lof | 165/170 |
| 4,169,459 | 10/1979 | Ehrlich | 126/442 |

FOREIGN PATENT DOCUMENTS 2620976 11/1977 Fed. Rep. of Germany ...... 126/432

Primary Examiner—Larry Jones
Attorney, Agent, or Firm—Woodard, Weikart, Emhardt & Naughton

[57] ABSTRACT

A modular, air-to-air solar energy collector for adding heat to a circulating flow of air includes a frame-like enclosure and a solar radiation absorbing plate disposed within the frame-like enclosure. The enclosure includes a light-transmissive outer panel, a back panel, an air inlet adjacent a first end and an air outlet adjacent at the same end. A first air flow passageway is defined by the light-transmissive outer panel and the outwardly facing surface of the solar radiation absorbing plate and a second air flow passageway is defined by the inwardly facing surface of the solar radiation absorbing plate and the back panel. A connecting flow aperture at one end of the solar radiation absorbing plate provides flow communication between the first air flow passageway and the second air flow passageway such that entering air passes across the outwardly facing surface of the absorbing plate and is then routed through the connecting flow aperture to the second air flow passageway. The back side of the solar radiation absorbing plate is provided with a plurality of heat-conductive panels which define a maze-like tortuous path through the second air flow passageway such that the entering air is preheated and then routed to the other second air flow passageway where this air absorbs further heat as it passes across both sides of each heat-conductive panel as the air makes its way to the air outlet.

4 Claims, 3 Drawing Figures

SOLAR COLLECTOR

BACKGROUND OF THE INVENTION

This invention relates in general to solar energy collectors and in particular to such collectors which are designed as modular, air-to-air units.

The field of solar energy heating is currently quite active, although many facets of the technology are actually in their infancy. New developments and discoveries are occurring quite rapidly and these often cause earlier theories to be abandoned and new approaches to be explored. The fundamental concepts involved with solar radiation absorption and subsequent heat transfer are in a very general sense easy to understand. For example, a black body type of surface is capable of absorbing incident solar radiation more readily than is a white surface. Similarly, the rate of heat transfer from one medium to another depends in part on the temperature difference which is present between the two mediums. However, while these concepts are easy to understand, there are an even greater number of factors whose effect both singularly and in combination with other parameters is not easily determined. Consider such factors as collector plate size, material and coating, also the flow rate and composition of the working fluid, the positional orientation of the collector relative to incident solar radiation, and the manner of utilization of the working fluid for subsequent heating. Although with time and experimentation, a particular combination of factors could be arranged in a single collector which might be an optimal design, at least as to those particular factors, there are still further constraints which must be considered. These constraints include the cost, mounting location requirements, mounting space availability, the suitability of the device for domestic as well as commercial use, the producibility and the reliability and maintainability of the device.

The following listed patents disclose solar energy concepts which have been conceived, presumably in an effort to provide an improvement over the prior art in existence at the time of their conception.

| Patent No. | Patentee | Issue Date |
| --- | --- | --- |
| 991,161 | McHenry | 5/02/11 |
| 2,680,437 | Miller | 6/08/54 |
| 3,902,474 | Pyle | 9/02/75 |
| 3,987,786 | Keyes et al. | 10/26/76 |
| 3,995,615 | Hojnowski | 12/07/76 |
| 4,018,211 | Barr | 4/19/77 |
| 4,020,989 | Kautz | 5/03/77 |
| 4,029,080 | Warren | 6/14/77 |
| 4,038,969 | Smith | 8/02/77 |
| 4,046,133 | Cook | 9/06/77 |

McHenry discloses a solar heat motor wherein a solar collector having a series of offset, upright panels is employed for absorption of heat and heat transfer to a circulating medium. The panels defined a tortuous path across the collector surface.

Miller discloses a solar heat trap wherein a solar collector is arranged within an enclosure and the collector includes a plurality of offset plates which define a series of pathways through the heat trap and across the surface of the plates.

Pyle discloses a solar heat converter which includes a box with a maze of air passageways which are partially filled with shredded heat-conductive material.

Keyes et al. discloses self-contained apparatus for collecting, storing and transmitting solar heat. The collector unit is provided with a series of baffles to expose conditioning air to the heat-collecting surfaces as the air follows a tortuous path through the apparatus.

Hojnowski discloses a solar heat collector panel which includes amolded plastic base with longitudinally extending channels. A flat metal heat-absorbing plate is disposed just below the cover and a corrugated plate is welded to the underside of the heat-absorbing plate to define fluid passageways.

Barr discloses an arrangement for solar energy collection and transfer wherein a honeycombed panel assembly includes a heat-transfer multi-celled honeycomb layer and a plurality of lateral fluid passageways formed in the cell walls for guiding and passing heat transfer fluid.

Kautz discloses a light-transmitting building panel wherein upper and lower corrugated sheets are laterally offset relative to a central sheet so as to define a plurality of passageways between the various corrugations and each face of the central sheet.

Warren discloses a thermal collector of solar energy for installation in the roof structure of a building. The collector includes a thermally conductive backing which carries an energy-absorbing material through a plurality of passageways. The backing is also arranged as one side of an air-flow passageway for heat transfer from the backing to a circulating flow of air.

Smith discloses a solar energy collector with an energy absorbing structure wherein a plurality of open-ended cells are arranged in a honeycomb style and a tortuous air flow path is provided in and out through the cells for absorbing and carrying away the energy collected by the cells.

Cook discloses a solar panel assembly which includes a heat-absorptive panel and a series of covering panels which permit the passage of light. A single flow passageway is disposed across one surface of the heat-absorptive panel and the opposite, back surface of this panel is thermally insulated.

Unfortunately, what each of these references disclose, with the exception of Miller, is either a relatively complicated collector design involving a significant number of component pieces and the need for somewhat precise fabrication techniques or a relatively complicated system often employing liquid as a heat-transfer medium. Although the performance of such collectors and systems may be suitable for their intended purpose, when the incorporation of such collectors and systems into a particular structure involves significant construction and/or modifications to that structure, then the versatility of the device is lost and the cost may not be affordable. Due to the wide range of heating demands which can be supplemented by the use of solar energy, what is needed is a portable, modular unit which can easily and inexpensively be adapted to various structures for a variety of heating demands. Equally important is that such a device be inexpensive to manufacture and provide a relatively basic construction style. While the device of Miller does appear to provide an inexpensive, portable, air-to-air unit, this device incorporates a plurality of flow paths and a limited amount of surface area for solar radiation absorption. The device utilizes glass plates for heat storage and although glass does not lose heat by radiation, the heat-storage capacity of glass is less than that of aluminum for the same mass and thus the overall solar radiation heat absorption and heat capacity of the device, relative to its weight, is limited. Furthermore, glass acts somewhat as an insulator and will not conduct heat throughout its surface as readily as would aluminum, and this reduces the rate of uniform heat distribution throughout the heat-transfer surfaces. These various drawbacks reduce the efficiency of such a unit in that incident solar radiation will not be rapidly conducted throughout the surfaces across which the working medium passes and this reduces the heat transfer to the working medium and consequently limits the ability of the collector surface to absorb additional solar radiation.

SUMMARY OF THE INVENTION

A modular, air-to-air solar energy collector for adding heat to a circulating flow of air according to one embodiment of the present invention comprises a frame-like enclosure having a light-transmissive outer panel, a back panel, air inlet means, air outlet means, a solar radiation absorbing plate disposed within the frame-like enclosure, a first air flow passageway in communication with the air inlet means and located between the solar radiation absorbing panel and the light-transmissive outer panel, and a second air flow passageway in communication with the first air flow passageway at a location adjacent one end of the frame-like enclosure and with the air outlet means at the other end of the frame-like enclosure, the second air flow passageway being on the opposite side of the solar radiation absorbing plate from the first air flow passageway and the air inlet means and the air outlet means both being disposed adjacent the other end of the frame-like enclosure.

One object of the present invention is to provide an improved air-to-air solar energy collector.

Related objects and advantages of the present invention will be apparent from the following description.

DESCRIPTION OF THE PREFERRED EMBODIMENT

Figure 1:
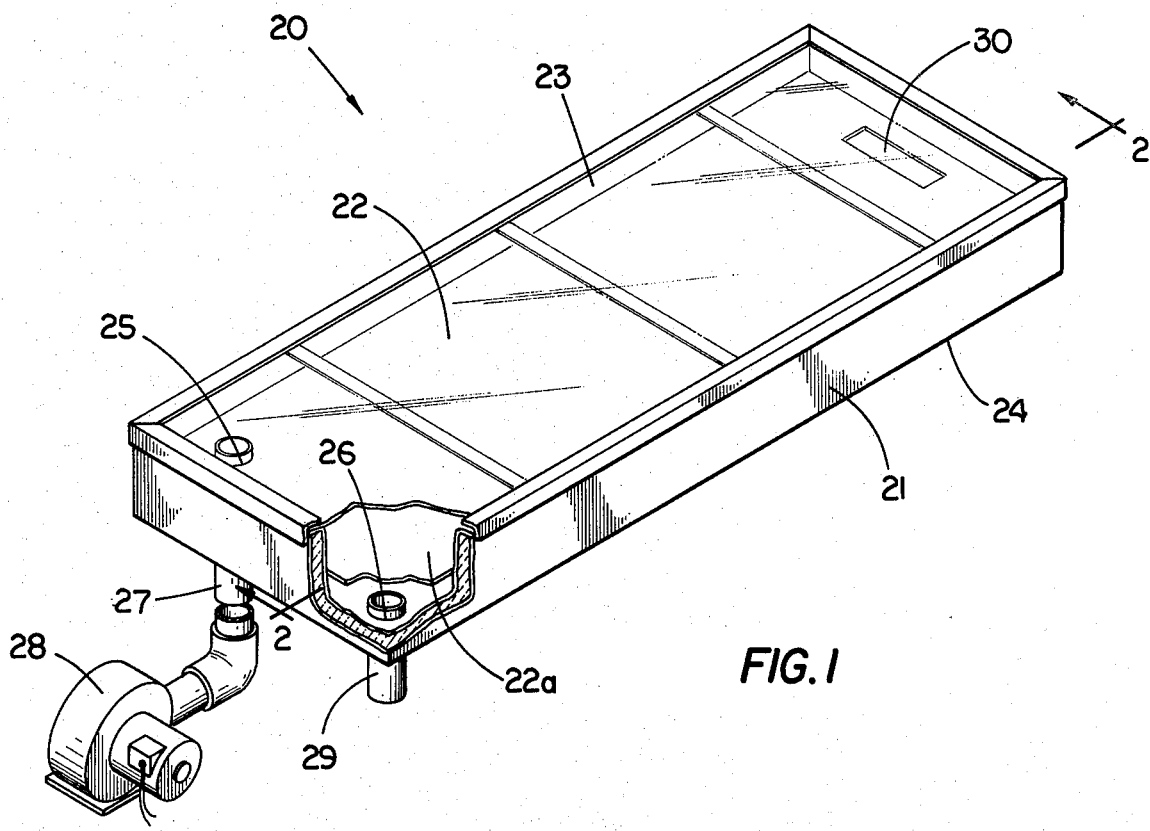
FIG. 1 is a fragmentary perspective view of a modular, air-to-air solar energy collector according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a modular, air-to-air solar energy collector 20 which includes a frame-like enclosure 21 and a solar radiation absorbing plate 22 disposed within the frame-like enclosure 21. Enclosure 21 includes a light-transmissive outer panel 23, a back panel 24, an air inlet aperture 25 and an air outlet aperture 26. The inside dimensions of frame-like enclosure 21 are approximately 3 feet (0.91 meters) by 7 feet (2.13 meters) and inasmuch as solar radiation absorbing plate 22 extends throughout the interior portion of enclosure 21, absorbing plate 22 has a solar radiation collecting surface area of approximately 21 square feet (1.94 square meters). Enclosure 21 is of a double-wall construction with insulating material positioned between the interior wall and the exterior wall. This collecting surface area is sufficient to provide the heating needs for a room or area having an 8-foot ceiling height and approximately 300 square feet of floor area.

Coupled to air inlet aperture 25 is an inlet duct 27 which couples to a fan arrangement or blower 28. Similarly coupled to air outlet aperture 26 is an air outlet duct 29. Blower 28 may be arranged to input atmospheric air into collector 20 or blower 28 may be arranged in communication with the return air duct of a building or structure. When arranged as part of the return air duct system, blower 28 introduces cool return air into collector 20 and this air passes across the outwardly facing surface 22a of absorbing plate 22 during which time it will begin to extract a portion of the heat stored within plate 22 so long as there is a suitable temperature difference present between the entering air and the plate surface. Although one form of collector 20 would be to provide the collector with only air inlet aperture 25 and air outlet aperture 26 and not with either duct 27 or 29 or with blower 28, the preferred embodiment is to include ducts 27 and 29 and blower 28 as part of collector 20. Alternatively, blower 28 could also be positioned within frame-like enclosure 21 in order to facilitate the connection of ducts 27 and 29 to a larger system.

Figure 2:
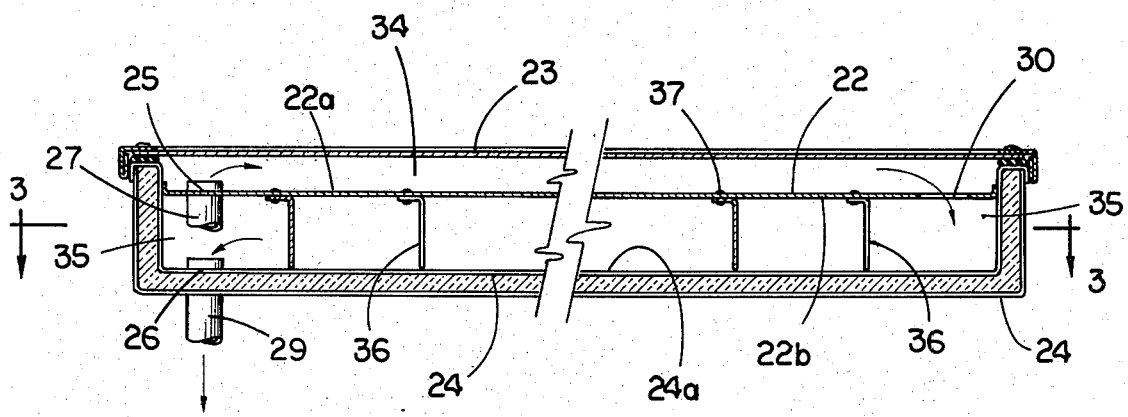
FIG. 2 is a side elevation view in section of the FIG. 1 solar energy collector as taken along line 2—2 in FIG. 1.

At the opposite end of absorbing plate 22 from where the cool return air is introduced by blower 28 is a connecting flow aperture 30 which permits the air reaching that location to pass below absorbing plate 22 into a second portion of collector 20 as is illustrated by FIG. 2. Referring to FIG. 2, there is illustrated a first flow passageway 34 which is defined by the outermost surface of absorbing plate 22 and the innermost surface of outer panel 23 and the surrounding contiguous portions of frame-like enclosure 21. Inasmuch as light-transmissive outer panel 23 and outwardly facing surface 22a are each substantially flat and arranged substantially parallel to each other, first flow passageway 34 is substantially flat and of a uniform depth (thickness) throughout. By constructing enclosure 21 as a substantially sealed unit, all the air which is introduced into air inlet aperture 25 will pass across the outermost surface 22a of absorbing plate 22 and will ultimately pass through connecting flow aperture 30 into a second flow passageway 35 which is defined by the lowermost, inwardly facing surface 22b of absorbing plate 22 and the uppermost surface 24a of back panel 24 and by the contiguous surrounding portions of frame-like enclosure 21. This second air flow passageway 35 extends from a first location adjacent connecting flow aperture 30 to a second location adjacent air outlet aperture 26. By this arrangement, the entering air flow passes in a first direction across absorbing plate 22 and then backtracks in the opposite direction across the underside of absorbing plate 22 in a single, continuous flow path. This requires that air inlet aperture 25 and air outlet aperture 26 be disposed adjacent the same end of frame-like enclosure 21 and further, that these apertures be disposed on opposite sides of absorbing plate 22.

Figure 3:
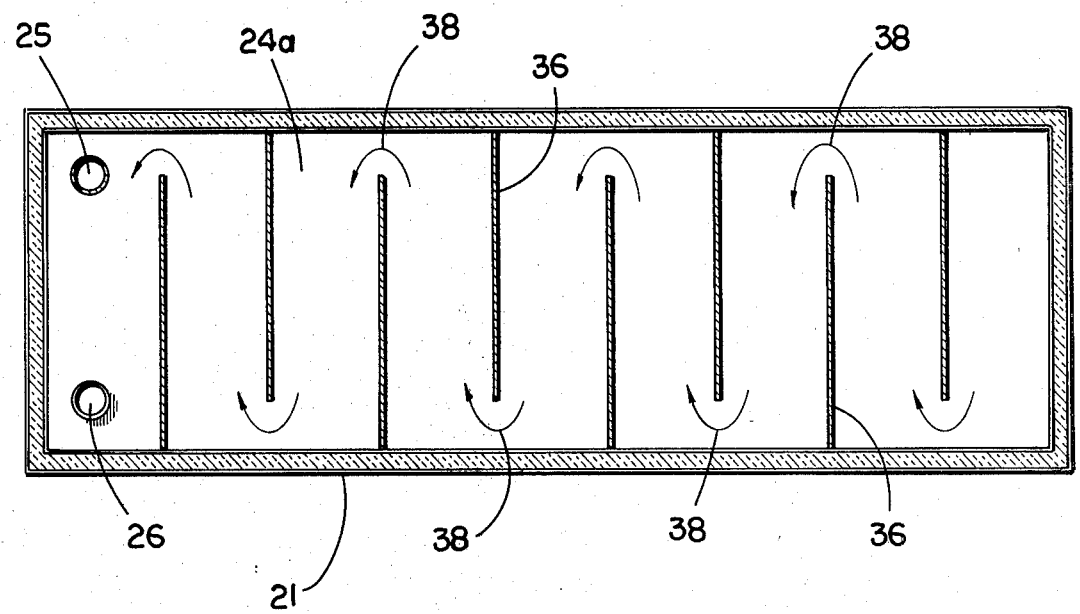
FIG. 3 is a plan view in full section of the FIG. 1 solar energy collector as taken along line 3—3 in FIG. 2.

One important feature of solar radiation absorbing plate 22 is that the underside 22b is provided with a plurality of heat-conductive panels 36 which are arranged in a staggered or offset arrangement as is illustrated in FIG. 3. Each heat-conductive panel 36 extends in a sealed fashion from the underside 22b of absorbing plate 22 to the uppermost surface 24a of back panel 24. However, these various heat-conductive panels 36 are arranged with alternately open ends relative to the adjacent sides of enclosure 21 such that a single flow path is permitted from flow aperture 30 to air outlet aperture 26 through second flow passageway 35. This single flow path is tortuous in nature in that the air flow entering second flow passageway 35 by way of connecting flow aperture 30 must wind back and forth, from side to side of enclosure 21 across the various heat-conductive panels 36 until the flow reaches outlet aperture 26. This back and forth snake-like path as indicated by arrows 38 (see FIG. 3) assures that the entire surface area on both sides of each heat-conductive panel 36 will be placed in contact with the circulating air flow such that maximum heat extraction from these heat-conductive surfaces is achieved. In order to maximize the heat storage and heat content of these various heat-conductive panels, it is important that each panel 36 be secured to absorbing plate 22 in such a way as to assure excellent heat transfer from absorbing plate 22 to each of the panels. There are various heat-conductive compounds which may be utilized at the interface between the panels 36 and plate 22 and in addition to this compound it is desirable to rigidly secure each panel 36 to plate 22 by means of threaded fasteners 37 or a similar mechanical attachment. Although the various panels 36 could be welded to plate 22, the use of threaded fasteners permits a certain degree of versatility in that additional panels 36 can be added at closer spacing, or panels could be removed, depending upon the particular requirements of the collector 20. Each panel 36 is arranged in a substantially perpendicular orientation to surface 22b and panels 36 are parallel to each other. Furthermore, panels 36 are uniformly spaced apart such that the cross-sectional area of the single flow path through passageway 35 is virtually the same at all locations.

In operation, what occurs is that the outermost surface of absorbing plate 22 will receive and absorb incident solar radiation. As the heat content and temperature of plate 22 build up, a portion of this heat is conducted into each of the various heat-conductive panels 36 which store this heat until such time as it is given up to the flow of air (which is at a lower temperature). The use of panels 36 permits the effective surface area for heat transfer of plate 22 to be increased without the outside dimensions of plate 22 having to be enlarged. This enables a maximum heat transfer capability without necessitating a solar energy collector which would be too large or too heavy to be either portable or conveniently utilized in combination with a structure. Each panel 36 is approximately 27 inches long and 3 inches wide and there are 9 arranged across surface 22b of plate 22 approximately 9 inches apart. This arrangement provides a heat-transfer surface area for the second flow passageway of approximately 31.13 square feet which is over 40 percent more heat-transfer surface area than that of the first flow passageway. The first flow passageway acts as a preheating chamber wherein a portion of the stored heat is convected to the air flow prior to entry into the second flow passageway. Once in the second flow passageway, the flow of air winds a tortuous path across the surfaces of the heat-conductive panels as well as passing across inwardly facing surface 22b. By allowing greater surface area contact, the air flow is heated still further before exiting.

The following test data information is provided as an actual test result indication of these tempertures achievable by the solar energy collector described herein. The date of this test data is Sunday, Feb. 4, 1979 and the location is Indianapolis, Ind. The times of day range from 1:00 p.m. to 3:30 p.m. as indicated in the first column and the temperature range for this particular time interval was from between 6° F. to 10° F. The second column indicates the temperature in degrees Fahrenheit as measured in the second flow passageway 35 which is behind or below solar radiation absorbing plate 22. The third column indicating low temperature in degrees Fahrenheit indicates the measured temperature in first flow passageway 34 which is between the solar radiation absorbing plate and the light-transmissive outer panel 23. The air flow rate at the time this data was recorded was at a rate of 460 CFM.

| Time of Day | High Temp. °F. | Low Temp. °F. |
| --- | --- | --- |
| 1:00 p.m. | 155 | 126 |
| 1:30 p.m. | 149 | 123 |
| 1:55 p.m. | 147 | 120 |
| 2:35 p.m. | 145 | 117 |
| 3:00 p.m. | 138 | 112 |
| 3:30 p.m. | 126 | 104 |

The design herein can be utilized in a roof-type mounting as well as a vertical wall or conveniently on the ground adjacent to a structure. This solar energy collector may also be moved from one location to another with a minimum of inconvenience and thus may find a variety of uses such as, for example, the heating of a garage, workshop or barn or the drying of grain. This solar energy collector 20 is usable with any forced air system and may be suitably arranged with conventional dampers and thermostats so as to only circulate air during those times that the internal temperature of the collector is sufficient to actually contribute to the heating of the structure or area. During nighttime or overcast conditions, the inlet and outlet apertures may be closed by providing a suitable damper arrangement and thus cool air is not permitted to circulate. By providing an air-to-air system, the significant expense of a liquid system including equipment cost as well as installation and adaptation costs is avoided. The air-to-air system is also the most convenient for easy adaptation to conventional heating systems and provides a solar energy collector which is light enough in weight so as not to require extensive structural modifications in order to be incorporated. This collector may also be utilized in combination with a storage unit such that a portion of the hot air which exits from outlet duct 29 is inputted to the storage medium and a portion of the output air goes to the heating of the structure. Then, during nighttime and overcast conditions, the storage unit releases a portion of its stored heat and continues to supplement the conventional heating system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A portable, modular, air-to-air solar energy collector for introducing and adding heat to a circulating flow of air, said solar energy collector comprising:

a generally rectangular, free-standing, frame-like enclosure having a back panel, a surrounding side wall, and an enclosing light-transmissive outer panel, the combination of said back panel, said surrounding side wall, and said enclosing light-transmissive outer panel defining an enclosed air space interior thereto;

a solar radiation absorbing plate disposed within said frame-like enclosure, said solar radiation absorbing plate having a radiation-facing top surface and a finned bottom surface, and being suitably arranged to segment said enclosed air space into two air flow passageways;

an air inlet conduit extending from a location exterior of said frame-like enclosure through said back panel and through said solar radiation absorbing plate, said air inlet conduit being suitably adapted for connection to a source of air at a location exterior of said frame-like enclosure;

an air outlet conduit extending from a location exterior of said frame-like enclosure through said back panel, said air outlet conduit being suitably adapted for flow connection to a remote use location for utilization of any exiting air;

said solar radiation absorbing plate and said light-transmissive outer panel defining a first air flow passageway across the top surface of said solar radiation absorbing plate, said first air flow passageway having an inlet end in communication with said air inlet conduit and an opposite exit end, said first air flow passageway being free of any intermediate structures which functionally relate to the transfer of heat; and said solar radiation absorbing plate and said back panel defining a second air flow passageway across said bottom surface, said second air flow passageway having an inlet end in communication with the exit end of said first air flow passageway at a location adjacent one end of said frame-like enclosure and an opposite exit end in communication with said air outlet conduit adjacent the opposite end of said frame-like enclosure, said air flow passageways being arranged to provide a continuous, singular flow path from said air inlet conduit to said air outlet conduit.

2. The portable, modular, air-to-air solar energy collector of claim 1 wherein the finned bottom surface of said solar radiation absorbing plate includes a plurality of spaced apart, heat-conductive panels arranged so as to define a tortuous path for said second air flow passageway back and forth laterally across said bottom surface.

3. The portable, modular, air-to-air solar energy collector of claim 1 wherein said solar radiation absorbing plate includes a single flow aperture therethrough, the exit end of said first air flow passageway and the inlet end of said second air flow passageway communicating with each other solely by means of said single flow aperture.

4. The portable, modular, air-to-air energy collector of claim 3 which further includes a blower coupled to said air inlet conduit for introducing a forced air flow across said solar radiation absorbing plate.

* * * * *